J. P. S. Otterson
Tapping Mains.

N° 15,385. Patented July 22, 1856.

UNITED STATES PATENT OFFICE.

JAMES P. S. OTTERSON, OF NASHUA, NEW HAMPSHIRE.

METHOD OF TAPPING FLUIDS UNDER PRESSURE.

Specification of Letters Patent No. 15,385, dated July 22, 1856.

*To all whom it may concern:*

Be it known that I, JAMES P. S. OTTERSON, of the city of Nashua, county of Hillsboro, and State of New Hampshire, have invented a new and useful Machine for Drilling and Tapping Pipes or Vessels Containing Water Under Pressure and Inserting Service-Cocks Therein; and I do hereby declare that the following is a full, clear, and exact description thereof, reference being had to the accompanying drawings, making part of this specification, in which—

Figure 2:
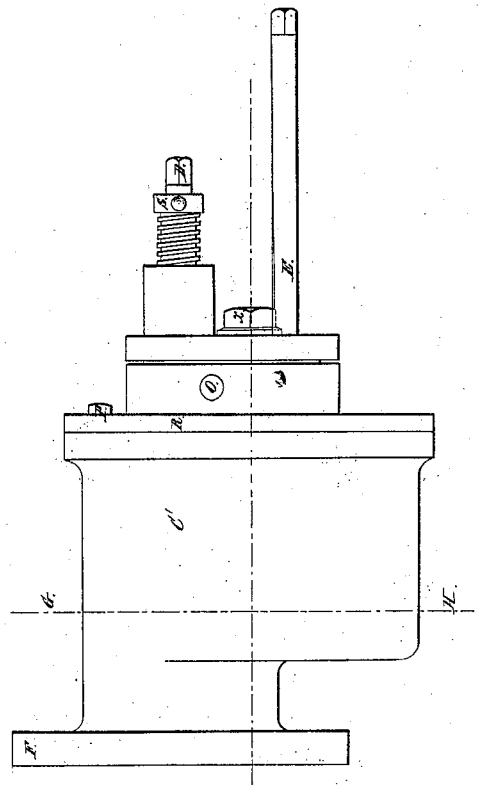
Figure 4:
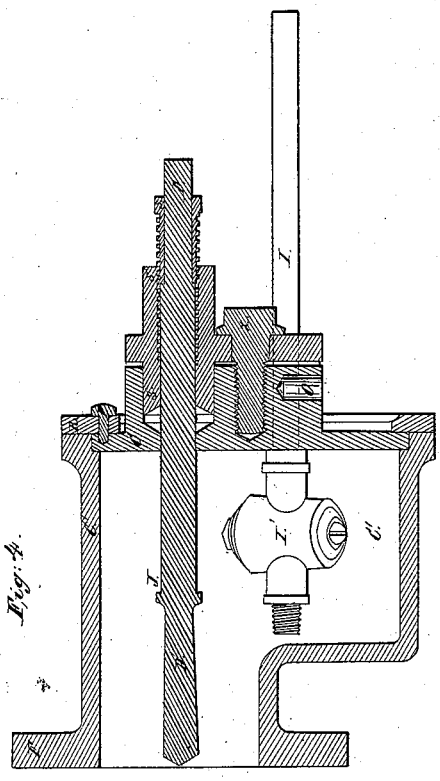
Figure 1:
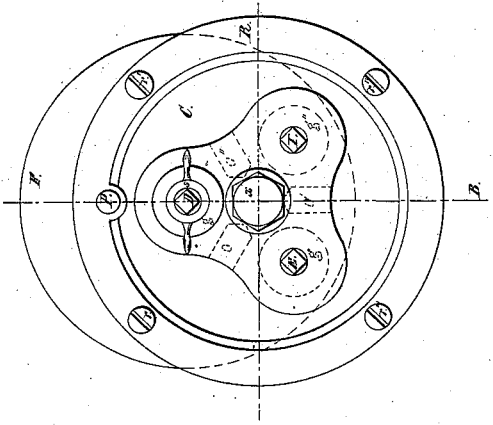
Figure 3:
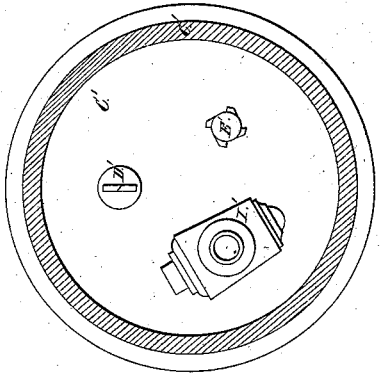

Figure 1 shows a front elevation. Fig. 2 shows a side elevation. Fig. 3 shows a transverse section on the line G, H. Fig. 4 shows a longitudinal section on the line A, B.

The principal features of my invention consist, 1st, of the hollow chamber C' of sufficient capacity to contain the cock (to be inserted in the pipe or vessel containing water) together with the necessary tools used in performing the operation, and, 2d, of the rotary plate C working in or forming part of the aforesaid chamber.

The operation of my machine is as follows, it being bolted, barred, clamped or fastened in any manner by the flange F upon the pipe or vessel which it is desirable to drill, and from which water is to be conducted (any suitable packing intervening between the flange and pipe to prevent leakage). The drill D', D is pushed forward, the male screw S inserted into the nut S', and a crank, ratchet, or other moving power being applied to the spindle D it is fed toward the pipe or vessel to be drilled by the feeding screws S, S' in the same manner as is commonly done with hand drills. The hole having been drilled, the screw S withdrawn, and the drill D', D drawn back to the shoulder J, the chamber becomes filled with water from the pipe or vessel which is being drilled, but the water is prevented from leaving the machine in any great quantity by the stuffing boxes $g$ $g'$ $g''$ around each of the spindles, D, E, I, and the close joint around the rotary plate C. The plate C is then made to turn part of a revolution (by inserting a lever in one of the holes $o$, $o'$ $o''$ made for that purpose) so as to bring the tap E' E opposite the hole made by the drill D' D. The tap E' E is then pushed forward and the hole made by the drill tapped out to correspond with the screw cut on the extremity of the cock L'. This being accomplished the tap is drawn back the plate C made to turn another part of a revolution, so as to bring the cock I' opposite the hole drilled and tapped by the before mentioned machinery, when the spindle I, together with the cock I', is pushed forward and the cock I' inserted or screwed into the hole by means of a wrench or similar apparatus applied to the spindle I. The spindle I, which merely serves as a holder for the cock I' and is screwed into one end of the same, is then released by unscrewing and the machine detached from the pipe or vessel, leaving the cock inserted, as was desired from the commencement, or, the machine may be removed, leaving the spindle I in the cock, to be taken therefrom and replaced in its proper position in the machine afterward.

Having thus fully described my invention and explained the manner of its operation, I would say that what I claim and desire to secure by Letters Patent of the United States, is—

1. The employment of a chamber C' of sufficient capacity to contain the cock I' together with the necessary tools for inserting the same in any pipe or vessel containing water under pressure.

2. The employment of the rotary plate C or its equivalent, working in or forming part of the chamber C' for the uses and purposes as herein specified.

I do not limit my claims to the particular form of plate or chamber as herein shown but extend it to any other substantially the same.

JAMES P. S. OTTERSON.

Witnesses:
J. WESLEY CHURCHILL,
GEORGE R. HOLT.